Nov. 10, 1925.

J. R. SINCLAIR 1,561,117

PAPER CYLINDER MOLD

Filed April 9, 1921

INVENTOR
JOHN R. SINCLAIR

Joseph J. O'Brien
ATTORNEY

Patented Nov. 10, 1925.

1,561,117

UNITED STATES PATENT OFFICE.

JOHN R. SINCLAIR, OF HOLYOKE, MASSACHUSETTS.

PAPER-CYLINDER MOLD.

Application filed April 9, 1921. Serial No. 460,130.

*To all whom it may concern:*

Be it known that JOHN R. SINCLAIR, a citizen of the United States of America, residing at Holyoke, in the county of Hampden and State of Massachusetts, has invented certain new and useful Improvements in Paper-Cylinder Molds, of which the following is a specification.

This invention relates to improvements in cylinders and rolls for paper making and working machinery and one of the objects of the invention is to provide a foraminous cylinder or roll construction in which the use of intermediate spiders and reinforcing rods connected thereto is eliminated and the body of the cylinder or roll is built upon an extended helix composed of flat ribbon metal and stiffened by spirally disposed bonding wires and longitudinally disposed bonding elements secured to the inner and outer edges of the helix.

With the above and other objects in view this invention relates to certain new and useful constructions, combinations and arrangements of parts, clearly described in the following specification and fully illustrated in the accompanying drawings, in which.

Figure 1:
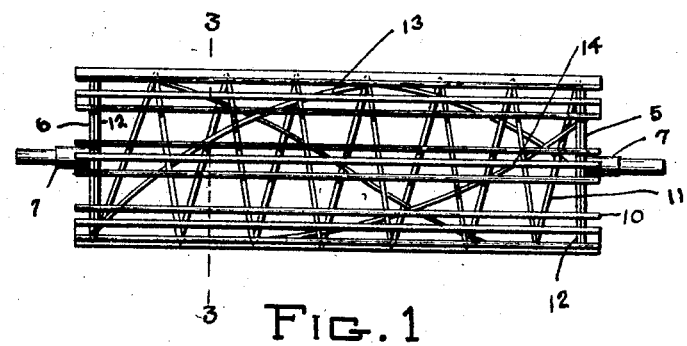
Figure 1 is a side elevation.
Figure 2:
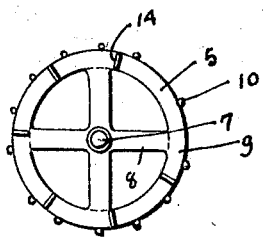
Figure 2 is a transverse sectional view.
Figure 3:
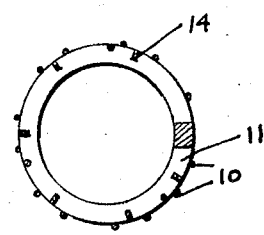
Figure 3 is an end view.

Referring to the accompanying drawings 5 and 6 designate the end spiders or supports each of which is provided with a trunnion 7 of tubular formation or otherwise, and each spider is formed integral with the radiating arms 8 which are integrally connected to the rim 9.

A series of longitudinal bonding elements or stay rods 10 are connected at their opposite ends to the end supports 5 and 6, said ends soldered or otherwise fixed thereto, said rods being spaced circumferentially an equal distance from each other.

A helix 11 constructed of flat ribbon metal is arranged within the open wall provided by the longitudinal stay rods 10 and the outer edge portions of the separated turns of said helix are fixed by solder or other means to the stay rods 10 at the points of contact therewith. Each end of the helix is provided with a coil 12 which is fastened at a point slightly spaced from the adjacent end support or spider and in substantially parallel relation to the end support or spider. A series of stay rods or wires 13 are connected at the outer edge portions of the turns of the helix 11 and are arranged in spiral relation thereto but in a direction opposed to that of the helix and are connected at the points of intersection with a longitudinal stay rod or wires 10 by means of solder or other means. A series of flat longitudinal stay rods or elements 14 are disposed against the inner edges of the turns of the helix in spaced relation to each other and positively secured by solder or other means to said inner edges.

The flat bars or rods 14 are inserted in slots 14a formed in the helix 11 so that the outer edge portions of said rods 14 will be flush with the outer periphery of the helix 11. The points of engagement between the rods and the helix are stiffened by solder which serves to fix the engaging parts against relative motion under the rolling action developed under working conditions.

Having described my invention I claim:

A paper cylinder mold consisting of end spiders having circular rims and hubs, trunnions mounted in the hubs, a flat helix having end coils parallel to each other, united to the rims in parallel relation thereto and holding the spiders in spaced relation, said helix having external notches therein, flat bars in said notches flush with the external edge of the helix, a series of rods mounted on the turns of the helix and on the rims and end coils, and a helix extending in an opposite direction to and secured on the first helix.

Signed by me at Holyoke, Mass.

JOHN R. SINCLAIR.